United States Patent
Mallary et al.

(10) Patent No.: US 8,605,382 B1
(45) Date of Patent: Dec. 10, 2013

(54) DISK DRIVE TO LOAD A HEAD TO A LOAD/UNLOAD (LUL) ZONE OF A DISK

(75) Inventors: Michael L. Mallary, Sterling, MA (US); Donald Brunnett, Pleasanton, CA (US); Diep L. Nguyen, Castro Valley, CA (US); Gerardo A. Bertero, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 366 days.

(21) Appl. No.: 13/155,675

(22) Filed: Jun. 8, 2011

(51) Int. Cl.
  *G11B 5/54* (2006.01)
  *G11B 21/02* (2006.01)

(52) U.S. Cl.
  USPC ............................................. 360/75

(58) Field of Classification Search
  None
  See application file for complete search history.

(56) References Cited

U.S. PATENT DOCUMENTS

| | | | |
|---|---|---|---|
| 6,067,202 A * | 5/2000 | Rowan et al. | 360/73.03 |
| 6,560,054 B1 * | 5/2003 | Ottesen et al. | 360/75 |
| 6,920,009 B2 * | 7/2005 | Xu et al. | 360/75 |
| 6,937,419 B2 | 8/2005 | Suk et al. | |
| 7,019,932 B2 * | 3/2006 | Hirano et al. | 360/75 |
| 7,042,668 B1 | 5/2006 | Emo | |
| 7,151,644 B2 | 12/2006 | Xu et al. | |
| 7,154,698 B2 | 12/2006 | Flechsig et al. | |
| 7,164,549 B2 | 1/2007 | Flechsig et al. | |
| 7,298,575 B2 | 11/2007 | Flechsig et al. | |
| 7,688,534 B1 | 3/2010 | McCornack | |

* cited by examiner

*Primary Examiner* — Hoa T Nguyen
*Assistant Examiner* — James L Habermehl (57) ABSTRACT

A disk drive to load a head to a load/unload (LUL) zone of a disk is disclosed. The disk drive comprises an actuator including a head; a disk having a plurality of tracks; and a processor to control the movement of the actuator and the head relative to the disk. The processor may further: measure a back electromagnetic force (BEMF) of a spindle stator of a spindle motor after turning off the spindle motor; identify a modulation feature of the BEMF that indicates an identifiable circumferential position; command the storage the modulation feature of the BEMF; and control loading the head onto the LUL zone of the disk when the modulation feature is matched.

22 Claims, 5 Drawing Sheets

DISK DRIVE TO LOAD A HEAD TO A LOAD/UNLOAD (LUL) ZONE OF A DISK

BACKGROUND

Today, computing devices such as personal computers, laptop computers, personal digital assistants, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive.

A huge market exists for disk drives for mass-market computing devices such as desktop computers, laptop computers, as well as small form factor (SFF) disk drives for use in mobile computing devices (e.g., personal digital assistants (PDAs), cell-phones, digital cameras, etc.). To be competitive, a disk drive should be relatively inexpensive and provide substantial capacity, rapid access to data, and reliable performance.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track.

Data is typically written to the disk by modulating a write current in an inductive coil of the head to record magnetic transitions onto the disk surface. During readback, the magnetic transitions are sensed by a read element (e.g., a magnetoresistive element) of the head and the resulting read signal is demodulated by a suitable read channel.

Disk drives often dynamically load a head onto the disk into a load zone during start-up. For example, typically, the head is loaded off a ramp onto outer diameter (OD) tracks that may be dedicated to being a load zone. The load zone may include a plurality of outer diameter tracks that span the width of the slider of the head. The load zone is typically not used for user data because of potential data loss due to head media contact (HMC) when the head is loaded onto the disk. HMC may thermally demagnetize the disk or damage the data layer. In particular, many disk drives utilize a dynamic load/unload (LUL) process to load the heads onto the media load zone (LZ) from a ramp during start-up and unload them from the LZ during shutdown.

Although previous attempts have been made by manufacturers to utilize the LZ for data storage in order to increase disk drive capacity, these efforts have been mostly abandoned due to data corruption from the violence of the LUL process. For example, heads may strike the media during the LUL process resulting in: thermal excursions that can demagnetize the disk; or actual physical damage that can destroy the data layer and produce asperities that can grow and ultimately result in head crashes. Accordingly, techniques to effectively utilize the LZ for data storage are sought after.

DETAILED DESCRIPTION

Figure 1:
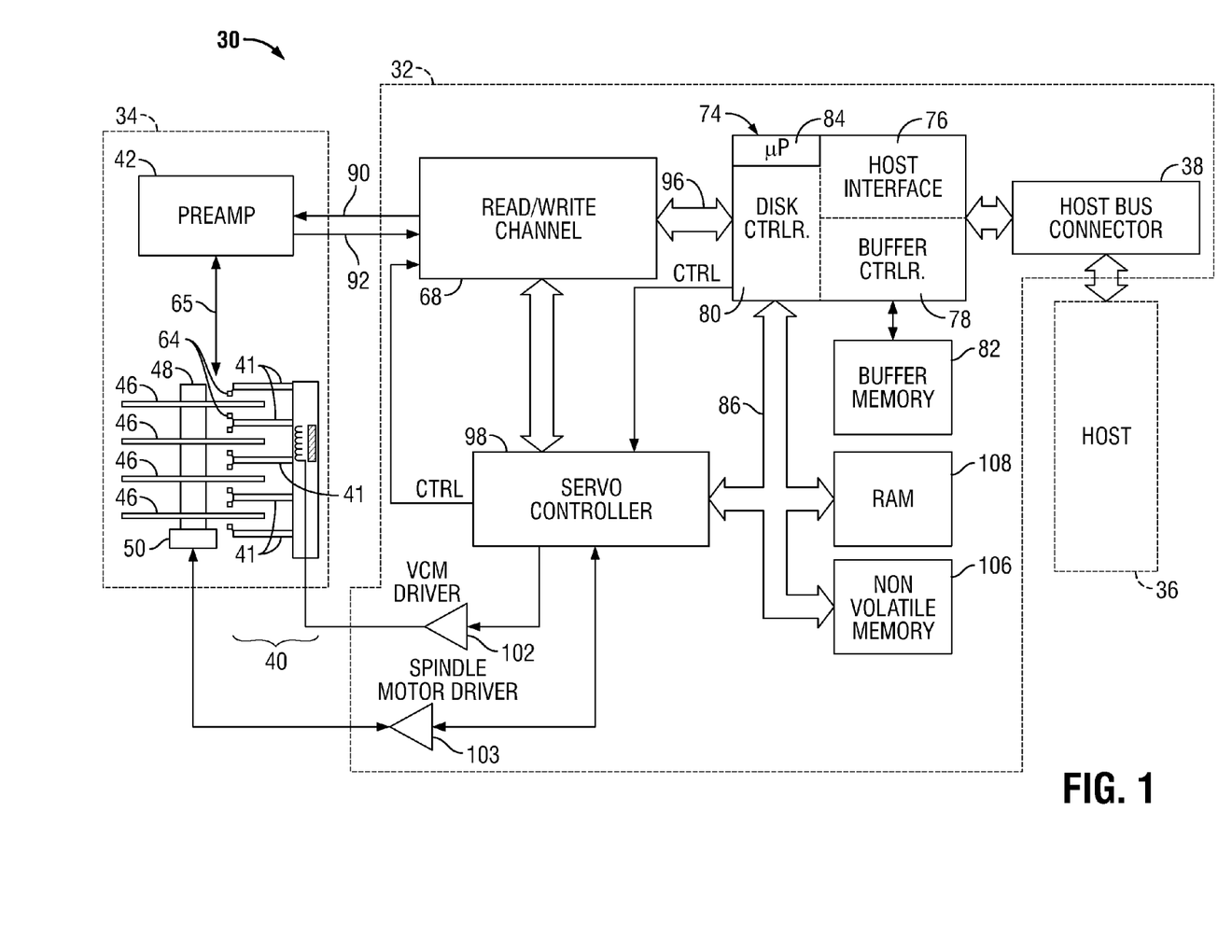
FIG. 1 shows a block diagram of a disk drive, in which embodiments of the invention may be practiced.

FIG. 1 shows a block diagram of a disk drive, such as a hard disk drive 30, in which embodiments of the invention may be practiced. The disk drive 30 may be connected to a host computer 36. Host computer 36 may be a desktop computer, a laptop computer, a mobile computing device (e.g., a personal digital assistant (PDA), camera, cell-phone, auto-navigation system, etc.), or any type of computing device utilizing a disk drive. Disk drive 30 comprises a Head/Disk Assembly (HDA) 34 and a controller printed circuit board assembly, PCBA 32. Disk drive 30 may be of any suitable form factor for its intended purpose. As should be appreciated hard disk drive 30 is an example of a hard disk drive and that other types of disk drives may be utilized with embodiments of the invention.

The HDA 34 may comprise: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90. A flex circuit cable assembly may be utilized to connect the HDA to the PCBA, as will be described.

Controller PCBA 32 may comprise a read/write channel 68, servo controller 98, host interface disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 may decode data into digital bits transferred on an NRZ bus 96 to HIDC 74. During write operations, HIDC may provide digital data over the NRZ bus to channel 68 which encodes the data prior to its transmittal to preamplifier 42. As an example, channel 68 may employ PRML (partial response maximum likelihood) coding techniques.

HIDC 74 may comprise a disk controller 80 for formatting and providing error detection and correction of disk data and other disk drive operations, a host interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk drive operations.

A servo controller 98 may provide an interface between microprocessor 84 and actuator assembly 40 and spindle motor 50. Microprocessor 84 may command logic in servo controller 98 to position actuator assembly 40 using a VCM driver 102 and to precisely control the rotation of spindle motor 50 with a spindle motor driver 103. Disk drive 30 may employ a sampled servo system in which equally spaced servo wedge sectors are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

Figure 2:
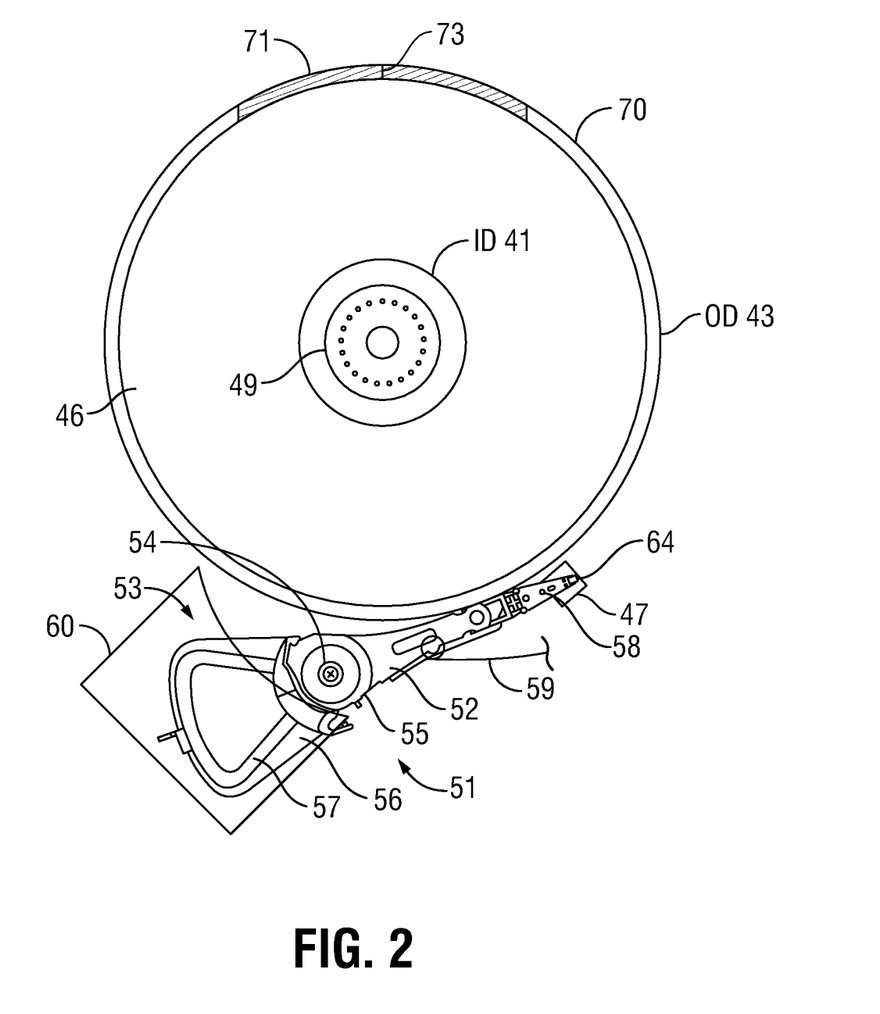
FIG. 2 shows a diagram of an actuator assembly, a disk, and a load/unload (LUL) zone, according to one embodiment of the invention.

With reference also to FIG. 2, FIG. 2 is an example of an actuator assembly, a disk, and a load/unload (LUL) zone. As shown in FIG. 2, a rotary actuator assembly 51 is shown relative to a disk 46 for pivoting the head 64 of the rotary actuator 51 about the disk to perform disk drive operations including: read/write operations; and to unload and load the head 64 from and to the motor load current ramp 47 onto the LUL zone 71 and from the LUL zone 71, respectively, as will be described, as part of start-up and powering down of the disk drive. Further, how the LUL zone 71 is defined will also be discussed in more detail later.

Disk 46 may be mounted within the disk drive on a spindle 48 of spindle motor 50 utilizing a disk clamp 49 for rapid rotation within the disk drive. The rotary actuator 51 in turn moves head 64 over the disk 46. The rotary actuator 51 may be part of a head stack assembly (HSA) of the HDA 34. It should be appreciated that HSAs and rotary actuators are well known in the art, and this is but one example. Looking at this particular example, a rotary actuator 51 may include a head gimbal assembly (HGA) 58 to which a head 64 is mounted, a body portion 55 having a pivot bore for receipt of a pivot bearing cartridge 54, at least one actuator arm 52 cantilevered from the body portion 55, and a coil assembly 53 cantilevered from the body portion 55 in an opposite direction from the actuator arm 52. The actuator arm 52 supports HGA 58 which supports head 64 for writing and reading data to and from the disk 46, respectively. For example, the head can include an inductive head that is used to both read and write data on a recording surface of the disk 46, or a magnetoresistance (MR) head, which includes a MR head element to read data and an inductive element to write data. Flex circuit cable 59 connects the processing circuitry of the PCBA 32 to the rotary actuator 51 of the HSA in order to deliver commands such as read and write commands, seeking and tracking commands, and unloading and loading the head 64 from and to the motor load current ramp 47 to and from the LUL zone 71, respectively.

The coil assembly 53 may includes a coil 57 and a fork 56. The fork 56 cantilevered from the body portion 55 in an opposite direction from the actuator arm 52 and mounts the coil 57. The rotary actuator 51 is pivotly secured to the base of the disk drive via the pivot bearing cartridge 54 mounted through the pivot bore of the body portion 55 of the rotary actuator arm 51. In this way, the head 64 at the distal arm of the HGA 58 may be moved over a surface of the disk 46. It should be appreciated that the rotary actuator 51 may include a vertical stack of HGAs supported by multiple actuator arms for use with multiple vertically stacked disks 46.

Further, as previously discussed with reference to FIG. 1, a voice coil motor (VCM) may be utilized with rotary actuator 51 in order to precisely position actuator 51 under the control of servo controller. In one example, the VCM may include one or more VCM plates 60 which include a permanent magnet. The coil 57 of the rotary actuator 51 may be disposed between the top and bottom VCM plates (only top plate 60 being shown) in order to form a voice coil motor (VCM) to cause the pivoting of the actuator 51 about the pivot axis defined by the pivot bearing cartridge 54 by inputting current into the coil 57. Thus, the VCM can be used to controllably position the head 64 of the actuator 51 relative to the disk. However, it should be appreciated that many other types of actuators and positioning means for the actuator may be utilized in accordance with embodiments of the invention, and this is just one example.

Looking particularly at disk 46, disk 46 includes an outer diameter (OD) track 43 and an inner diameter (ID) track 41. As should be appreciated, there are a plurality of tracks located between the OD track 43 and the ID track 41. As will be described in more detail hereinafter, a LUL zone 71 may be defined such that head 64 may be unloaded and loaded from and to the motor load current ramp 47 onto and from the LUL zone 71, respectively, as part of starting-up and powering down of the disk drive. The LUL zone 71 may include a plurality of outer diameter tracks. It should be appreciated that motor load current ramps 47 are well known in the art.

According to one embodiment of the invention, disk drive 30 may be utilized to load head 64 to the LUL zone 71 of disk 46. In particular, processor 84 of disk drive 30 may be utilized to control the movement of the actuator 52 and head 64 relative to disk 46. In particular, processor 84 may be utilized to: measure a back electromagnetic force (BEMF) from a spindle stator of spindle motor 50 after turning off the spindle motor 50; identify a modulation feature of the BEMF that indicates an identifiable circumferential position 73 of the disk 46; command the storage of the modulation feature of the BEMF to memory (e.g. non-volatile memory 106); and, during disk drive operation, control the loading of the head 64 from motor load current ramp 47 onto the LUL zone 71 when the modulation feature is determined to be matched. Thus, the head 64 is loaded into the LUL zone 71.

According to one embodiment of the invention, processor 84 may operate under the control of a program or routine to execute methods or processes in accordance with embodiments of the invention related to: measuring a BEMF from a spindle stator of the spindle motor, identifying a modulation feature, and controlling the loading and unloading of the head onto and from the LUL zone when the modulation feature is determined to be matched. For example, such a program may be implemented in a software or firmware (e.g., stored in non-volatile memory 106 or other locations) and may be implemented by processor 84. The details of these functions will be hereinafter described in detail.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

Components of the various embodiments of the invention may be implemented as hardware, software, firmware, microcode, or any combination thereof. When implemented in software, firmware, or microcode, the elements of the embodiments of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements. The program or code segments may be stored in a processor-readable medium or transmitted by a data signal embodied in a carrier wave, or a signal modulated by a carrier, over a transmission medium. The "processor-readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor-readable or accessible medium may include data that, when accessed by a processor or circuitry, causes the processor or circuitry to perform the operations described herein. The term "data" herein refers to any type of information that is encoded for machine-readable purposes. Therefore, it may include programs, code, data, files, etc.

Figure 3:
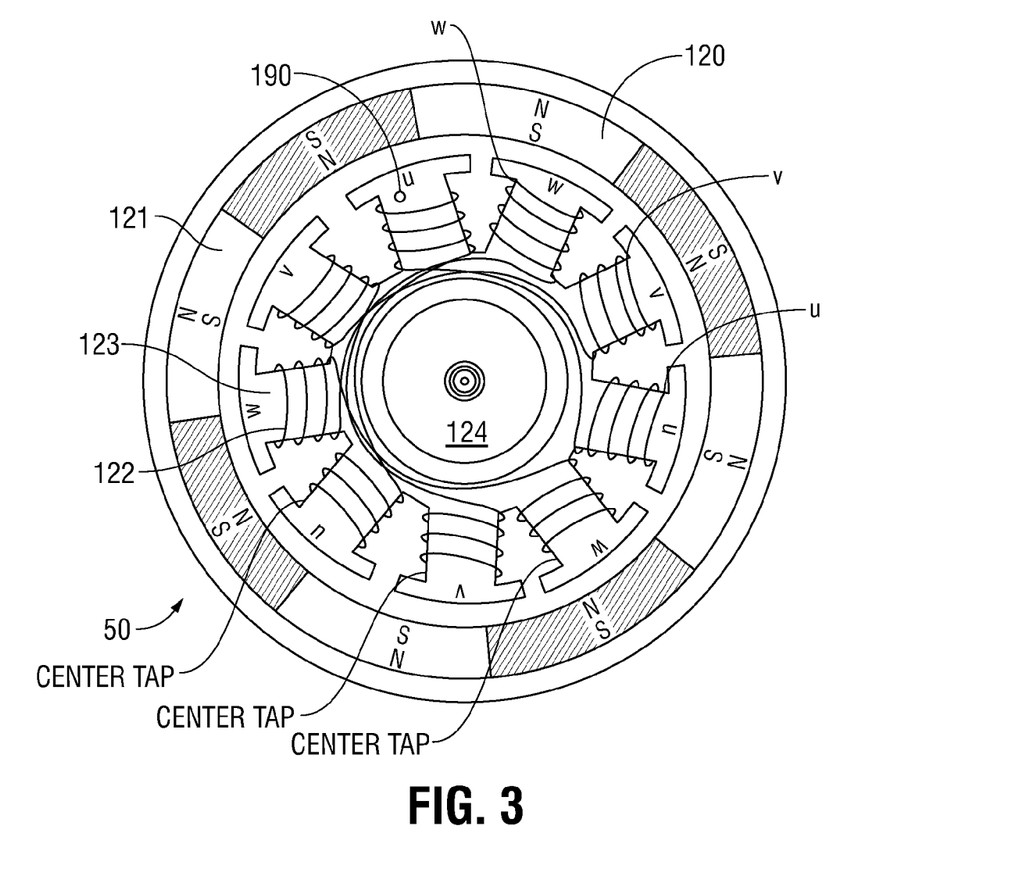
FIG. 3 is a diagram to more clearly illustrate portions of a spindle motor, according to one embodiment of the invention.

Turning briefly to FIG. 3, FIG. 3 is a diagram to more clearly illustrate portions of the spindle motor 50. Spindle motor 50 may include a brushless DC motor including a permanent magnet ring 120 having a plurality of poles 121 that have alternating magnetic field orientations and coil windings 122 fixed to spindle stator 123 which are part of the stationary base portion 124 of the spindle motor 50. In particular, FIG. 3 illustrates a spindle motor 50 having a permanent magnet ring 120 that includes eight alternating magnetic field orientations and nine stator slots or teeth 123.

During disk drive operations, coil windings 122 are energized in a predetermined sequence to generate a varying magnetic field within the motor 50. This varying magnetic field interacts with rotating magnetic fields of the permanent magnet ring 120 to impart rotational motion to the rotor. As can be appreciated, the timing with which the coil windings 122 are energized is important for achieving efficient motor performance. That is, the coil windings 122 must be energized so that they create proper magnetic field orientations and proper times to facility rotation of the rotor. Accordingly, the rotational position of the rotor with respect to the spindle stators is tracked to determine when to energize the coils.

The process of varying the coil energization as the rotor spins about the axis to facilitate rotation is known as "commutation" of the motor. A number of commutation "states" are generally defined to describe different coil drive arrangements that are desirably applied at different rotational positions of the rotor. During rotor rotation, the system repeatedly sequences through the commutation states based on the changing rotor position. To do this, the system identifies commutation points at which to "commutate" to a new state. Generally, commutation points are identified using the zero-crossing information of the BEMF of the un-driven phase generated in the coil windings 122 due to the alternating fields of the PM of the rotor.

According to one embodiment of the invention, disk drive 30 may be utilized to load head 64 to the LUL zone 71 of disk 46. Processor 84 of disk drive 30 may be utilized to control the movement of the actuator 52 and head 64 relative to disk 46. Further, processor 84 may be utilized to: measure a back electromagnetic force (BEMF) from a spindle stator 123 of spindle motor 50 after turning off the spindle motor 50; identify a modulation feature of the BEMF that indicates an identifiable circumferential position 73 of the disk 46; command the storage of the modulation feature of the BEMF to memory (e.g. non-volatile memory 106); and, during disk drive operation, control the loading of the head 64 from the motor load current ramp 47 onto the LUL zone 71 when the modulation feature is determined to be matched.

For example, processor 84 may be configured to measure the BEMF of a spindle stator 123 of spindle motor 50 after turning off the spindle motor 50 and then identifying a modulation feature of the BEMF that indicates an identifiable circumferential position 73 of the disk 46. As an example, the BEMF of the spindle stator 50 may be measured through the spindle motor driver 103 back to the servo controller 98 and thereafter be communicated to processor 84 via links 86 (see FIG. 1). However, processor 84 may receive the BEMF of a spindle stator 123 of the spindle motor 50 by other means. Further, processor 84 may command the storage of the modulation feature of the BEMF to a memory (e.g., non-volatile memory 106). In disk drive operation, the spindle motor 50 is turned on and then off, and allowed to coast while the processor 84 monitors the BEMF signal, and once the processor 84 matches the modulation feature, processor 84 may then command the loading of head 64 onto the LUL zone 71 of disk 46 and the re-energization of the spindle motor 50.

In one embodiment, loading the head 64 onto the LUL zone 71 when the modulation feature is determined to be matched may also include timing the initiation of the motor load current ramp 47. As one example, the LUL zone 71 may include a portion of the outer diameter track 70 of the disk 46. Further, the processor 84 may define the LUL zone 71 based upon an identifiable circumferential position 73 of the disk 46. However, other LUL zones on other tracks may be utilized. Additionally, processor 84 may modify the timing at the loading of the head 64 onto the LUL zone relative to the modulation feature such that the head 64 is loaded near the identifiable circumferential position 73.

Because the LUL zone 71 is defined by the processor 84, the rest of the outer track 70 and its neighbors in the LUL zone 71 may be freed up for user data in order to increase drive capacity. Moreover, the timing of the load process may be clocked by the processor 84 by monitoring the BEMF of a spindle stator 123. Thus, data may be placed in the majority of the outer track 70 outside of the previously defined LUL zone 71 by timing the LUL process to the spindle rotation such that head 64 loads in a particular circumferential region of the LUL zone 71 where user data is not stored. In this way, the remainder of the outer track 70 may be used to store user data.

In one embodiment, during manufacturing of the disk drive, the LUL zone 71 may be defined. In particular, the spindle motor 50 may be spun up and then turned off such that the spindle motor 50 coasts briefly. In this way, the processor 84 may measure the strength of the BEMF waveform without interference from the motor power source (e.g., spindle motor driver 103). In particular, reproducible modulation features of the BEMF that can be used to designate a preferred LUL circumferential zone 71 may be identified.

Figure 4:
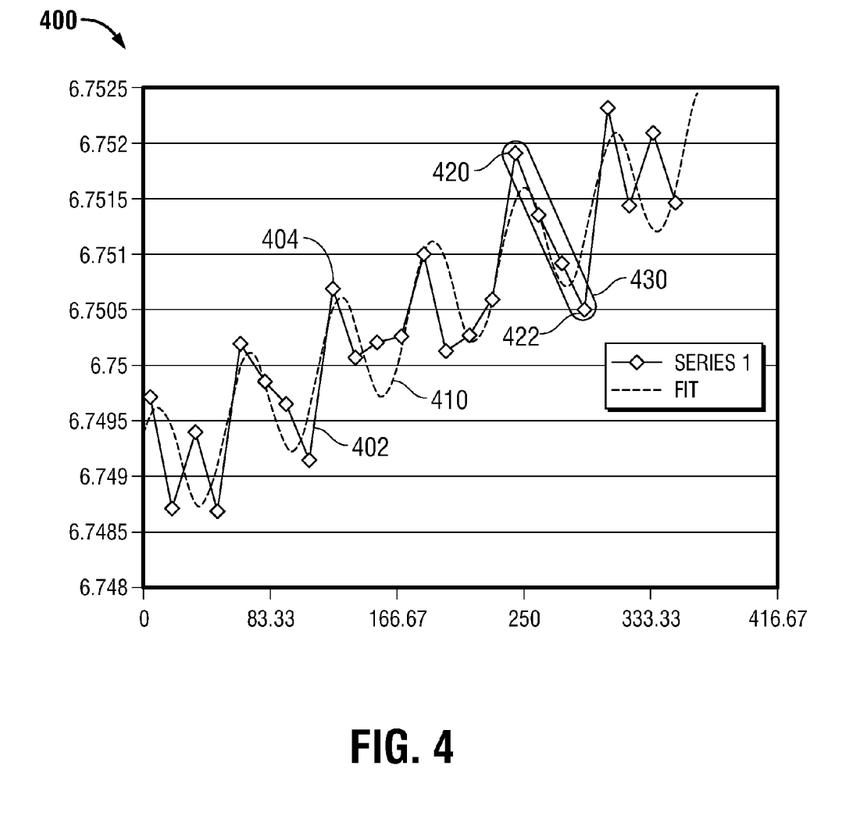
FIG. 4 is a chart showing a plot of the peak amplitudes of the sinusoid of the BEMF waveform as measured by the processor, according to one embodiment of the invention.

With reference to FIG. 4, an example of a BEMF peak voltage waveform 402 as measured by the processor 84 is illustrated. In particular, diagram 400 includes a Y axis identifying peak BEMF (Volts) and an X axis which shows the circumferential position of the spindle motor/disk in degrees. The BEMF peak voltage waveform 402 represents a plot of sample measurements of the BEMF for one of the three stator coils. Each of the diamond shaped points 404 is the value of the peak voltage of each of the 24 cycles of the BEMF that occurs every revolution as measured on one of the three winding sets of the stator coils (e.g. U, V, or W (as can be seen in FIG. 3)). Waveform 410 is a four parameter least squares fit to the fundamental frequency of the spindle motor.

As can be seen in FIG. 4, the modulation feature between point 420 and point 422, shown as modulation feature 430, stands out as being an unusually high amplitude difference relative to the sinusoid of the smooth curve 410. This indicates a modulation feature that can be stored in memory 106 that can be repeatedly utilized to be identified and to indicate an identifiable circumferential position (e.g. position 73) and a LUL zone 71 region of the OD track(s) 70 for continuously loading the head.

Thus, during manufacturing, this modulation feature 430 can be used to define the LUL zone 71 on the outer track 70 of the disk as well as the identifiable circumferential position 73 and can also be used in operation thereafter. Outside of the LUL zone 71 data sectors and spoke sectors may be utilized. In particular, during operation a spindle motor 50 can be powered on, turned off, and allowed to coast, and the BEMF of the spindle stator 123 of the spindle motor is monitored by the processor 84 until the modulation feature 430 is identified and then the motor load current ramp 47 is then utilized to load the head 64 onto the LUL zone 71 at or near the identifiable circumferential position 73. In particular, when the modulation feature 430 is matched, the initiation of the motor load current ramp 47 is launched to load the head onto the LUL zone 71. This provides a consistent way of loading the head 64 onto the LUL zone 71 at or near the identifiable circumferential position 73. However, it should be appreciated that the modulation feature 430 and/or the LUL zone may be modified by the disk drive outside of the manufacturing process.

Further, processor 84 may modify the timing of the loading of the head 64 relative to the modulation feature 430 such that the head 64 is loaded near the identifiable circumferential position 73—but still within the LUL zone 71. In this way, the timing of the initiation of the motor load current ramp 47 in accordance with the modulation feature 430 may be designed with time variability such that the loading of the head 64 does not always occur at exactly the same location (e.g., identifiable circumferential position 73) in order to prevent accumulation of damage at one particular LUL spot.

Also, when defining the LUL zone 71, asperities may be detected in the LUL zone 71. If an asperity is found, the LUL zone 71 may be modified. Asperity detection and avoidance in the LUL zone 71 may be used to prevent the growth of induced asperities.

As to unloading the head 64, in one embodiment, processor 84 may control the unloading of head 64 by monitoring the servo spokes (i.e., servo wedges) of the outside track 70 in conjunction with the modulation feature. For example, the servo spokes may be calibrated by the processor 84 to determine at which future time the unloading of the head 64 will commence. Also, processor 84 may modify the timing to unload the head 64 relative to the servo spokes to provide variability.

Thus, calibration to the BEMF waveform 402 and the modulation feature 430 may be used in conjunction with the servo spokes to unload the head 64 within the preferred LUL zone 71. Further, the LUL position may be varied within the LUL zone 71 to minimize accumulation of damage at a single LUL position.

Figure 5:
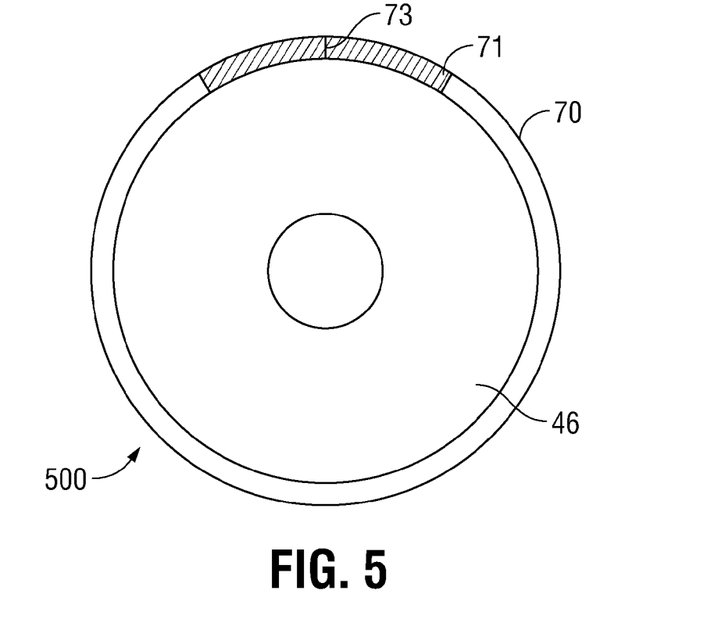
FIG. 5 is a diagram illustrating a LUL zone, according to one embodiment of the invention.

With brief reference to FIG. 5, FIG. 5 illustrates an example of a disk 46 utilizing an implementation of the LUL zone 500 based upon the identification of the modulation feature 430 of the BEMF that indicates an identifiable circumferential position 73, in which based upon the identifiable circumferential position 73, the LUL zone 71 may be set. In this example, LUL zone 71 may be set from an angle of approximately 0° to 80° and the rest of the track 70 and its neighbors from the LUL zone 71 is from an angular position of approximately 80° to 360° for the use of data sectors. In this way, by utilizing the previously-described identification of a modulation feature 430 of the BEMF, a LUL zone 71 portion may be set around an identifiable circumferential position 73 and the rest of the track and its neighbors from the LUL zone 71 are free to be utilized for data storage. It should be appreciated that different sized LUL zones may be utilized.

Figure 6:
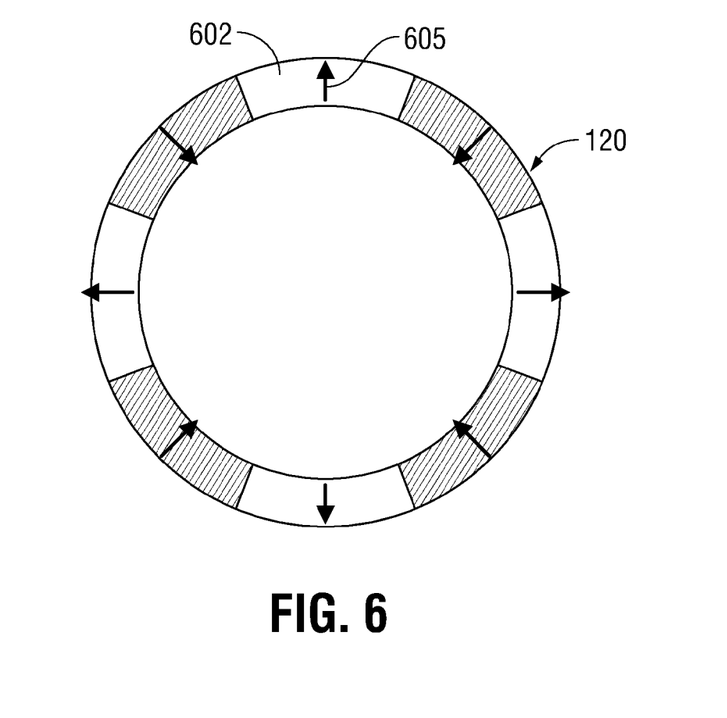
FIG. 6 is a diagram illustrating a pole of a magnetic ring of a spindle motor that is slightly demagnetized, according to one embodiment of the invention.

With brief reference to FIG. 6, in one embodiment, a pole 602 of the magnetic ring 120 of the spindle motor 50 may be slightly demagnetized (see arrow 605) (e.g., slightly lower magnetization −0.02%) to increase the modulation feature 430 of the BEMF such that the modulation feature 430 of the BEMF may be more identifiable. Thus, a small dipole component is deliberately induced to the octopole magnetization pattern of the spindle magnetization to make the once around modulation amplitude larger and more detectable. In other words, modulation feature 430 may be increased and be more detectable.

As another example, poles with slightly lower magnetization may be used. In order to achieve this, a dipole with the strength of about 0.01% of the octopole field may be achieved by shaving down the poles of the magnetic ring 120, which should induce a 6 sigma dipole feature in the BEMF. Further, during the LUL determinization portion, coast down measurements may be performed and parameters processed by processor 84 may be used to compensate the EMF waveform to adjust out any induced spindle velocity modulation.

In another embodiment (with brief reference back to FIG. 3), another way to increase the modulation feature 430 of the BEMF may be controlled by removing a portion (e.g., portion 190) of the magnetic metal of one of the spindle stators 123 to thereby increase the modulation feature 430 of the BEMF such that the modulation feature of the BEMF is more identifiable. For example, portion 190 may have a depth removal of approximately 1 millimeter or less.

In an additional embodiment, data in the LUL zone 71 may be written with extra error correction code (ECC) bits to increase its robustness against head 64 media contact events due to occasional mistiming of LUL zone head contact or growth of asperities in the LUL zone 71. If a LUL timing error is detected (e.g. by reading servo spokes after the LUL is passed), the data near the mistimed LUL can be read for growth of errors and can be rewritten (e.g. corrected), before it becomes unrecoverable.

In additional embodiments, processor 84 may select LUL current ramp parameters for the ramp 47 that would reliably load the head 64 into a target LUL angular zone and then test the variability of the LUL zone by measuring the servo spokes. An algorithm may be utilized to vary the exact angular load position within this target LUL zone which may be calibrated with LUL experiments.

Further, as to unloading, the LUL zone 71 may be scanned for evidence of hard (permanent) asperities using a number of detect strategies (e.g., velocity variation due to dynamic flight height (DFH), position motor current modulation due to DFH modulation, Wallace Spacing loss variation, etc.). Further, the LUL parameters may be reset so that the LUL occurs reliably after the asperities have passed by. Also, bad block regions may be defined near asperities. Additionally, during disk drive operation, micro jog around (positioned motor current spikes) or over (DFH voltage=zero) may be used to avoid asperities. Thus, during disk drive operation, growing asperities in the LUL zone 71 may be searched for and processor 84 may be set to avoid them.

The methods and processes described previously can be employed by a disk drive. However, other types of data storage devices with similar or other media format characteristics can be employed by those skilled in the art to use the invention with equal advantage to implement these techniques.

What is claimed is:

1. A disk drive to load a head to a load/unload (LUL) zone of a disk comprising:
   an actuator including a head;
   a disk having a plurality of tracks; and
   a processor to control the movement of the actuator and the head relative to the disk, the processor configured to:
      measure a back electromagnetic force (BEMF) of a spindle stator of a spindle motor after turning off the spindle motor;
      identify a modulation feature of the BEMF that indicates an identifiable circumferential position;
      command the storage of the modulation feature of the BEMF; and
      control loading the head onto the LUL zone of the disk when the modulation feature is matched.

2. The disk drive of claim 1, further comprising a motor load current ramp, wherein loading the head unto the LUL zone when the modulation feature is matched includes timing the initiation of the motor load current ramp.

3. The disk drive of claim 1, further comprising the processor modifying the timing of the loading of the head relative to the modulation feature such that the head is loaded near the identifiable circumferential position.

4. The disk drive of claim 1, further comprising the processor defining the LUL zone based upon the identifiable circumferential position.

5. The disk drive of claim 4, wherein the LUL zone includes a portion of a track of the disk.

6. The disk drive of claim 5, wherein defining the LUL zone further comprises detecting an asperity in the LUL zone.

7. The disk drive of claim 5, wherein the processor controls unloading the head by monitoring servo spokes.

8. The disk drive of claim 7, wherein the processor modifies the timing relative to the servo spoke to unload the head.

9. The disk drive of claim 1, wherein a pole of a magnetic ring of the spindle motor is slightly demagnetized to increase the modulation feature of the BEMF such that the modulation feature of the BEMF is more identifiable.

10. The disk drive of claim 1, wherein a portion of magnetic metal of one of the spindle stators is removed to increase the modulation feature of the BEMF such that the modulation feature of the BEMF is more identifiable.

11. The disk drive of claim 1, wherein the LUL zone disk includes data with extra error correcting code (ECC) bits.

12. A method to load a head of a disk drive to a load/unload (LUL) zone of a disk comprising:
   measuring a back electromagnetic force (BEMF) of a spindle stator of a spindle motor after turning off the spindle motor;
   identifying a modulation feature of the BEMF that indicates an identifiable circumferential position;
   storing the modulation feature of the BEMF; and
   loading the head onto the LUL zone of the disk when the modulation feature is matched.

13. The method of claim 12, wherein loading the head unto the LUL zone when the modulation feature is matched includes timing the initiation of a motor load current ramp.

14. The method of claim 12, further comprising modifying the timing of the loading of the head relative to the modulation feature such that the head is loaded near the identifiable circumferential position.

15. The method of claim 12, further comprising defining the LUL zone based upon the identifiable circumferential position.

16. The method of claim 15, wherein the LUL zone includes a portion of a track of the disk.

17. The method of claim 16, wherein defining the LUL zone further comprises detecting an asperity in the LUL zone.

18. The method of claim 16, wherein unloading the head further comprises monitoring servo spokes.

19. The method of claim 18, further comprising modifying the timing relative to the servo spoke to unload the head.

20. The method of claim 12, further comprising slightly demagnetizing a pole of a magnetic ring of the spindle motor to increase the modulation feature of the BEMF such that the modulation feature of the BEMF is more identifiable.

21. The method of claim 12, further comprising removing a portion of magnetic metal of one of the spindle stators to increase the modulation feature of the BEMF such that the modulation feature of the BEMF is more identifiable.

22. The method of claim 12, further comprising writing data in the LUL zone with extra error correcting code (ECC) bits.

* * * * *